United States Patent
Hwang et al.

Patent Number: 5,928,622
Date of Patent: Jul. 27, 1999

[54] METHOD FOR PREPARING HIGH CAPACITY LIMN$_2$O$_4$ SECONDARY BATTERY CATHODE COMPOUNDS

[75] Inventors: Kang Seon Hwang, Taejeon; Seung Eui Kim, Seoul; Dong Hwan Kim, Taejeon, all of Rep. of Korea

[73] Assignee: Korea Kumho Petrochemical Co., Ltd., Seoul, Rep. of Korea

[21] Appl. No.: 08/865,939

[22] Filed: May 30, 1997

[30] Foreign Application Priority Data

Mar. 21, 1997 [KR] Rep. of Korea ............... 97-9718

[51] Int. Cl.$^6$ .................................................. H01M 4/50
[52] U.S. Cl. ........................ 423/594; 423/599; 429/224
[58] Field of Search .............................. 423/594, 599; 429/224

[56] References Cited

U.S. PATENT DOCUMENTS

| | | | |
|---|---|---|---|
| 5,639,438 | 6/1997 | Eligen | 423/599 X |
| 5,677,087 | 10/1997 | Amine et al. | 423/599 X |
| 5,702,674 | 12/1997 | O'Young et al. | 423/599 X |
| 5,716,737 | 2/1998 | Hasegawa et al. | 423/599 X |

OTHER PUBLICATIONS

Electrochemical Characteristics of Spinel Phase LiMn$_2$O$_4$–Based Cathode Materials Prepared by the Pechini Process, W. Liu, K. Kowal and G.C. Farrington, J. Electrochem. Soc., vol. 143, No. 11., Nov. 1996, pp. 3590–3596.

Dissolution of Spinel Oxides and Capacity Losses in 4 V Li/Li$_x$Mn$_2$O$_4$ Cells, Dong H. Jang, Young J. Shin, and Seung M. Oh, J. Electrochem. Soc., vol. 143, No. 7, Jul. 1996, pp. 2204–2211.

The Spinel Phases LiM$_y$Mn$_{2-y}$O$_4$ (M=Co, Cr, Ni) as the Cathode for Rechargeable Lithium Batteries, Li Guohua, H. Ikuta, T. Uchida, and M. Wakihara, J. Electrochem. Soc., vol. 143, No. 1, Jan. 1996, pp. 178–182.

*Primary Examiner*—Stephen Kalafut
*Attorney, Agent, or Firm*—Jacobson, Price, Holman & Stern, PLLC

[57] ABSTRACT

Technologies regarding camcorder, cellular phone and note book PC etc. have been developing rapidly according to the development of electronics, communication and computer industries. The secondary battery which can be used continuously by recharging has been required for the electric power of such instruments. Therefore, present invention relates to a high-capacity LiMn$_2$O$_4$ compound used for non-aqueous electrolyte lithium ion battery, more particularly, to a method for preparing LiMn$_2$O$_4$ intercalation compound doped with Li and Co ion, which comprises the following steps of : synthesis of spinel type LiMn$_2$O$_4$ powder; dissolving and treating LiMn$_2$O$_4$ powder in the solution to adsorb Li and Co ion; and thermal treatment of said LiMn$_2$O$_4$ to obtain LiMn$_2$O$_4$ doped with Li and Co ion.

3 Claims, 1 Drawing Sheet

A: The variation curve in the discharging capacity of LC 1
B: The variation curve in the discharging capacity of LC 4
C: The variation curve in the discharging capacity of LC 8
D: The variation curve in the discharging capacity of LM A: The variation curve in the discharging capacity of LC 1
B: The variation curve in the discharging capacity of LC 4
C: The variation curve in the discharging capacity of LC 8
D: The variation curve in the discharging capacity of LM

METHOD FOR PREPARING HIGH CAPACITY LIMN$_2$O$_4$ SECONDARY BATTERY CATHODE COMPOUNDS

BACKGROUND OF THE INVENTION

1. Field of the Invention

The present invention relates to a high-capacity LiMn$_2$O$_4$ compound used for non-aqueous electrolyte lithium ion battery, more particularly, to a method for preparing LiMn$_2$O$_4$ intercalation compound doped with Li and Co ion, which comprises the following steps of : synthesis of spinel type LiMn$_2$O$_4$ powder ; dissolving and treating LiMn$_2$O$_4$ powder in the solution to adsorb Li and Co ion ; and thermal treatment of said LiMn$_2$O$_4$ to obtain LiMn$_2$O$_4$ doped with Li and Co ion.

2. Description of Prior Art

Technologies regarding camcorder, cellular phone and note book PC etc. have been developing rapidly according to the development of electronics, communication and computer industries. The secondary battery which can be used continuously by recharging has been required for the electric power of such instruments. Especially, lithium ion batteries in which lithium ion can be reversibly charged and discharged has been researched for its high voltage(3~4 V) and high energy density(about 100 Wb/Kg).

In a lithium ion battery, compounds which can charge and discharge lithium ions are used as the materials for cathode and anode. Especially, compounds of transition metal oxide, such as, LiCoO$_2$, LiNiO$_2$, LiMn$_2$O$_4$ are chiefly regarded as good cathode materials with respect to electric power, energy density and safety. Among them, LiMn$_2$O$_4$ has been regarded as desirable material in the point of the price of material and the effect to environment.

However, the application of LiMn$_2$O$_4$ to lithium ion battery has some handicaps due to the decline of discharging capacity by the result of repeated charging and discharging. One of the main reason why the capacity is declined by repeated charging and discharging has been regarded as the dissolution of Mn$^{+3}$ ion in LiMn$_2$O$_4$ to electrolyte and the structural unstability according to Jahn-Teller transition(*J. Electrochem Soc.* 143(1996) 2204).

To solve the above problems, the technology of doping metal salts, such as, Co, Cr and Ni salt to LiMn$_2$O$_4$ has been disclosed. For example, the method for preparing LiMn$_2$O$_4$ doped with metal salts comprising i) mixing lithium carbonate, manganese acetate and cobalt oxalate, ii) prethermal treatment of mixture at 600° C. for 6 hours, and iii) thermal treatment at 750° C. for 3 days in air was disclosed in *J. Electrochem. Soc.*, 143(1996) 178. Further, the method for LiMn$_2$O$_4$ doped with metal salts comprising i) mixing lithium salt, manganese salt and cobalt salt, and ii) thermal treatment at 800° C. for 6 hours was disclosed in *J. Electrochem Soc.*, 143(1996) 3590. However, the thermal treatment at high temperature in above methods causes the handicaps for the application to preparing doped LiMn$_2$O$_4$ used for cathode material in lithium ion battery.

(SUMMARY OF THE INVENTION)

The object of this invention is to provide a method for preparing LiMn$_2$O$_4$ doped with Li and Co ion to be used for cathode material of lithium ion battery. The method of present invention comprises the steps as follows;

i) preparing the spinel type LiMn$_2$O$_4$ powder as known method;

ii) preparing the aqueous solution dissolved in 0.1~10M of Li salt and 0.1~10M of Co salt;

iii) dissolving said LiMn$_2$O$_4$ powder to said aqueous solution;

iv) stirring and ultrasonic treating said mixed solution to adsorb Li and Co ion to LiMn$_2$O$_4$; and v) thermal treating said mixed solution at 600~800° C. for 1~3 hours to obtain the LiMn$_2$O$_4$ doped with Li and Co ion.

The further object of this invention is to provide a cathode material having LiMn$_2$O$_4$ doped with Li and Co ion used for lithium ion battery.

(DETAILED DESCRIPTION OF THE INVENTION)

Figure 1:
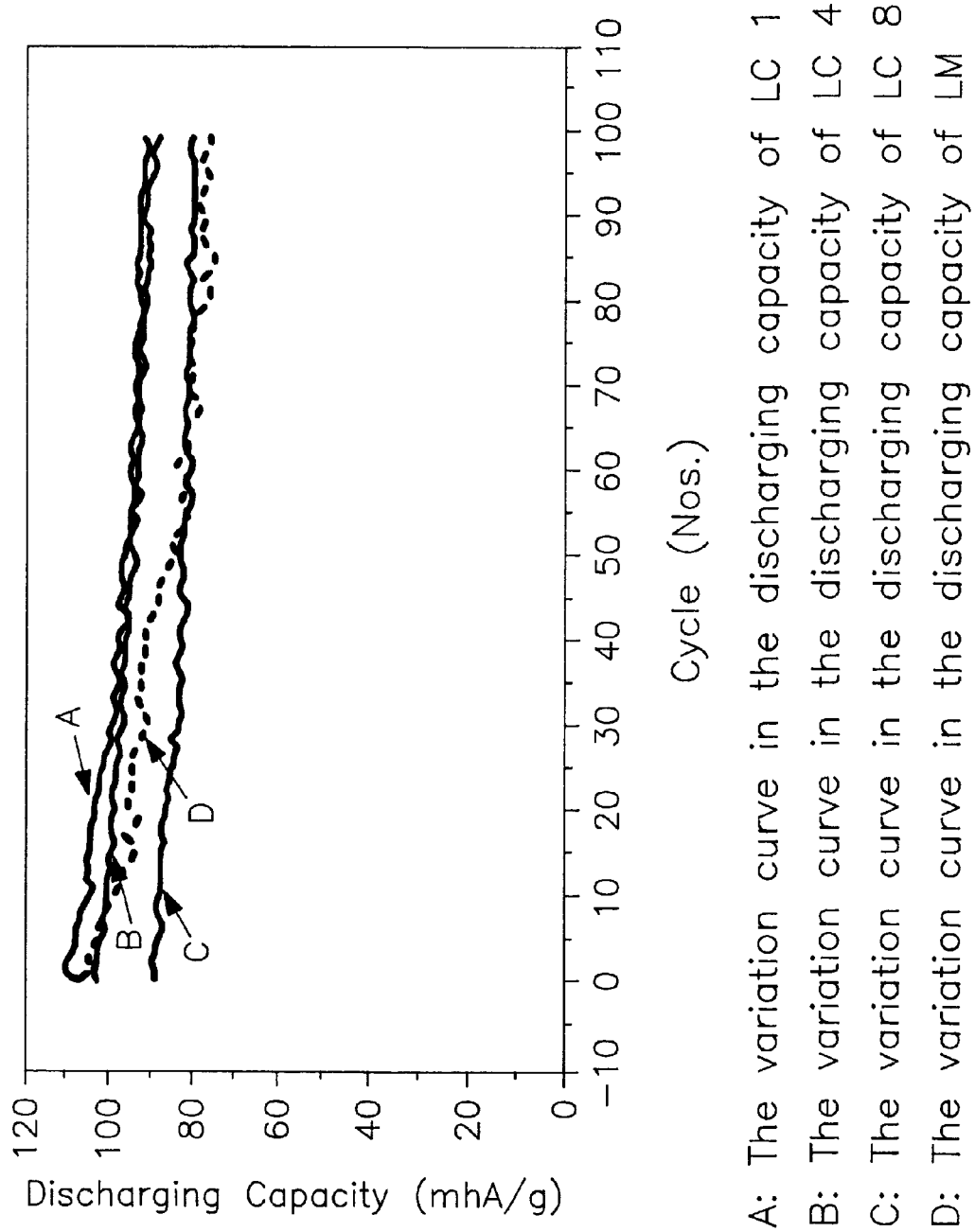
FIG. 1 shows the variations in discharging capacity of each prepared powder according to the cycles.

The spinel type LiMn$_2$O$_4$ powder is prepared according to any common procedure, e.g, by reacting mixed Li$_2$CO$_3$ and MnO$_2$ powders at about 800° C. for about 12 hours.

One or more selected from LiNO$_3$, LiCl, LiCH$_3$CO$_2$, LiOH and Li$_2$O$_4$ is used for Li salt, and one or more selected from Co(NO$_3$)$_2$·6H$_2$O, CoCl$_2$·xH$_2$O, Co(CH$_3$CO$_2$)·4H$_2$O, Co(OH)$_2$, CoSO$_4$·xH$_2$O is used for Co salt. Selected Li and Co salt are dissolved with distilled water in 0.9~1.1~1.1~0.9 (Li salt : Co salt) molar ratio. The concentration of each solution is 0.1~10M, preferably, 1~8M of Li salt and 1~8M of Co salt.

The prepared LiMn$_2$O$_4$ powder is dissolved in said prepared soultion dissolved in Li and Co salt, and the mixed solution is stirred vigorously and performed by ultrasonic treatment Then, the Li and Co ion are adsorbed to LiMn$_2$O$_4$.

Thereafter, said mixed solution is heated at 600~800° C. for 1~3 hours in air to remove the water and organic compounds in the mixed solution, and to dope Li and Co ion to said LiMn$_2$O$_4$. Finally, LiMn$_2$O$_4$ powder doped with Li and Co ion is obtained.

LiMn$_2$O$_4$ powder doped with Li and Co ion of the present invention and normal LiMn$_2$O$_4$ powder are analyzed by XRD(X-ray Diffractometry). Table 1 shows the result of analysis.

TABLE 1

| The variation of main peaks by XRD | | | |
|---|---|---|---|
| | (111)2θ | (311)2θ | (400)2θ |
| LM | 18.592 | 36.096 | 43.872 |
| LC1 | 18.632 | 36.130 | 43.956 |
| LC4 | 18.684 | 36.260 | 44.086 |
| LC8 | 18.710 | 36.312 | 44.138 |

LM : spinel LiMn$_2$O$_4$ powder without doping treatment
LC1 : LiMn$_2$O$_4$ powder adsorbed and treated by 1 M of Li and Co ion solution and thermally treated at 700° C. for 2 hours.
LC4 : LiMn$_2$O$_4$ powder adsorbed and treated by 4 M of Li and Co ion solution and thermally treated at 700° C. for 2 hours.
LC8 : LiMn$_2$O$_4$ powder adsorbed and treated by 8 M of Li and Co ion solution and thermally treated at 700° C. for 2 hours.

Even though all LiMn$_2$O$_4$ powders form the spinel structures, main peaks of doped LiMn$_2$O$_4$ powders are shifted to slightly larger angles compared to LiMn$_2$O$_4$ powder without doping treatment. The reason for shifting peaks is to become smaller of lattice unit size by doping a Co ion into the place of a Mn ion. On the other hand, the shift of peaks are increasing in accordance with the increase of Li and Co ion concentration. This shows the increase of doping quantity to $LiMn_2O_4$ powder according to the increase of Li and Co ion concentration.

After preparing electrode by mixing said prepared $LiMn_2O_4$ powder, carbon black as electric conductor and polyvinylidene fluoride as binder, the charging and discharging experiment is carried out to identify the cyclic properties of each electrode. FIG. 1 show the variations in discharging capacity of each prepared powder according to the cycles. Table 2 shows the variation of discharging capacity between the first cycle and the 100th cycle.

TABLE 2

The variation of discharging capacity

|  | first cycle discharging capacity (mhA/g) | 100th cycle discharging capacity (mhA/g) | *declining rate of discharging capacity (%) |
|---|---|---|---|
| LM(D) | 107 | 79 | −26 |
| LC1(A) | 107 | 89 | −17 |
| LC4(B) | 102 | 93 | −9 |
| LC8(C) | 78 | 71 | −9 |

( ) shows the A, B, C, D in FIG. 1
*declining rate of discharging capacity(%) = (100th discharging capacity − first discharging capacity)/100th discharging capacity × 100.

As shown in FIG. 1 and Table 2, the $LiMn_2O_4$ powder without doping treatment shows a rapid decline of discharging capacity after the 100th cycle compared to those of doping treatment(74% of the first cycle discharging capacity). On the contrary, the $LiMn_2O_4$ powder with doping treatment by 4M of Li and Co ion solution shows a slight decline of discharging capacity after the 100th cycle(91% of the first cycle discharging capacity).

In the case of the $LiMn_2O_4$ powder with doping treatment by 8M of Li and Co ion solution, its 100th discharging capacity is not better than that of $LiMn_2O_4$ powder without doping treatment due to the low first discharging capacity, even though the 100th discharging capacity maintains 91% of the first discharging capacity.

In the case of the $LiMn_2O_4$ powder with doping treatment by 1M of Li and Co ion solution, its 100th discharging capacity is better than that of $LiMn_2O_4$ powder without doping treatment, whereas its 100th discharging capacity is not better than that of $LiMn_2O_4$ powder with doping treatment by 4M of Li and Co ion solution. As a conclusion, the $LiMn_2O_4$ powder with doping treatment by 3~5M of Li and Co ion solution shows the best discharging capacity, and maintains the initial discharging capacity without a considerable loss after the 100th cycle.

This invention can be explained more concretly by the following examples. However, these examples do not limit the scope of this invention.

(EXAMPLE 1)

The spinel type $LiMn_2O_4$ was prepared according to the following procedure. $Li_2Co_3$ and $Mn_2O_4$ in about 1:4 molar ratio was crashed and mixed, and reacted at about 800° C. for 12 hours.

$LiNO_3$ and $Co(NO_3)_2 \cdot 6H_2O$ in about 1:1 molar ratio were dissolved in distilled water, and each of 1, 4 and 8M of Li and Co ion solution was prepared. The prepared spinel type $LiMn_2O_4$ powder was dissloved in each prepared solution in about 10 wt % concentration.

Each mixed solution was stirred vigorously and subjected to ultrasonic treatment. Each treated solution was filtered and dried at 100° C. for 24 hours. Each dried powder was heated at 700° C. for 2 hours to prepare $LiMn_2O_4$ powder doped with Li and Co ion to be used for charging and discharging experiments.

The slurry for coating an electrode was prepared by mixing the prepared $LiMn_2O_4$ powder, carbon black as electric conductor and polyvinylidene fluoride as binder in 93:5:2 weight ratio in moisture condition for 24 hours. The prepared slurry was coated to both sides of an aluminium plate electric collector(1 cm×1 cm), and the electrode was prepared after drying and pressing the slurry to the plate.

To indentify the charging and discharging property of the prepared electrode as mentioned above, a half-cell was manufactured in the glove box under Ar atmosphere. The ethylene carbonate-diethyl carbonate(1:1) solution dissolved with 1M of $LiPF_6$ was used as electrolyte and Li metal was used as a standard and counter electrode.

The experiment was carred out by a constant current having C/5 current density, the charging high voltage limit (4.3 V) and the discharging low voltage limit (3.0 V). The experiment was performed using a charging-discharging instrument manufactured by Toyo System under the above conditions for 100 cycles.

FIG. 1 shows the variations in discharging capacity of each prepared $LiMn_2O_4$ powder according to the cycles. A, B and C shows the variations of prepared $LiMn_2O_4$ powder doped with 1, 4 and 8M of Li and Co ion respectively. For the comparision, D shows the variation of spinel $LiMn_2O_4$ powder without doping treatment.

As a conclusion, the $LiMn_2O_4$ powder doped with Li and Co ion shows a slight decline of discharging capacity compared to $LiMn_2O_4$ powder without doping treatment.

(COMPARATIVE EXAMPLE 1)

The spinel type $LiMn_2O_4$ was prepared according to the following procedure. $Li_2CO_3$ and $Mn_2O_4$ in about 1:4 molar ratio was crashed and mixed, and reacted at about 800° C. for 12 hours.

The slurry for coating an electrode was prepared by mixing the prepared $LiMn_2O_4$ powder, carbon black as electric conductor and polyvinylidene fluoride as binder in 93:5:2 weight ratio in moisture condition for 24 hours. The prepared slurry was coated to both sides of an aluminium plate electric collector(1 cm×1 cm), and the electrode was prepared after drying and pressing the slurry to the plate.

To identify the charging and discharging property of the prepared electrode as mentioned above, a half-cell was manufactured in the glove box under Ar atmosphere. The ethylene carbonate-diethyl carbonate(1:1) solution dissolved with 1M of $LiPF_6$ was used as electrolyte and Li metal was used as a standard and counter electrode.

The experiment was carred out by a constant current having C/5 current density, the charging high voltage limit (4.3 V) and the discharging low voltage limit (3.0 V). The experiment was performed using a charging-discharging instrument manufactured by Toyo System under the above conditions for 100 cycles. In FIG. 1, D shows the variation of spinel $LiMn_2O_4$ powder without doping treatment.

We claim:

1. A method for preparing $LiMn_2O_4$ doped with Li and Co ion to be used for cathode material of lithium ion battery comprising the steps of:
   i) preparing the spinel type $LiMn_2O_4$ powder (as known method) made by solid state reaction of $Li_2CO_3$ and $MnO_2$;
   ii) preparing the aqueous solution dissolved in 0.1~10M or Li salt and 0.1~10M of Co salt;

iii) dissolving said $LiMn_2O_4$ powder to said aqueous solution;

iv) stirring and ultrasonic treating said mixed solution to adsorb Li and Co ion to $LiMn_2O_4$; and v) thermal treating said mixed solution at 600–800° C. for 1~3 hours to obtain the $LiMn_2O_4$ doped with Li and Co ion.

2. The method for preparing $LiMn_2O_4$ doped with Li and Co ion to be used for cathode material according to claim 1, wherein said Li salt is one or more selected from $LiNO_3$, LiCl, $LiCH_3CO_2$ and $Li_2SO_4$ and said Co salt is one or more selected from $Co(No_3)_2 \cdot 6H_2O$, $CoCl_2 \cdot xH_2O$, $Co(CH_3CO_2) \cdot 4H_2O$, and $CoSO_4 \cdot H_2$).

3. The method for preparing $LiMn_2O_4$ doped with Li and Co ion to be used for cathode material according to claim 1, wherein the concentration of each Li salt and Co salt solution is 1~8M of Li salt solution and 1~8M of Co salt solution.

* * * * *